(12) United States Patent
Liu (10) Patent No.: US 8,782,068 B2
(45) Date of Patent: Jul. 15, 2014

(54) METHOD, APPARATUS AND SYSTEM FOR PROTOCOL IDENTIFICATION

(75) Inventor: Hua Liu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 13/466,245

(22) Filed: May 8, 2012

(65) Prior Publication Data

US 2012/0221590 A1     Aug. 30, 2012

Related U.S. Application Data

(63) Continuation of application No. PCT/CN2010/077569, filed on Oct. 5, 2010.

(30) Foreign Application Priority Data

Dec. 10, 2009  (CN) .......................... 2009 1 0225440

(51) Int. Cl.
G06F 7/00       (2006.01)
G06F 17/30      (2006.01)
H04L 29/06      (2006.01)

(52) U.S. Cl.
CPC .............. H04L 29/06 (2013.01); H04L 69/22 (2013.01); Y10S 707/99933 (2013.01)
USPC ................... 707/758; 707/736; 707/999.003

(58) Field of Classification Search
CPC ............. G06F 17/2247; G06F 17/227; G06F 17/30876; G06F 17/30887; G06F 17/3092; G06F 8/30; G06F 8/51; G06F 9/45516
See application file for complete search history.

(56) References Cited

U.S. PATENT DOCUMENTS

| | | | |
|---|---|---|---|
| 7,240,041 B2 * | 7/2007 | Martin et al. | 706/48 |
| 2004/0148417 A1 | 7/2004 | Roh | |
| 2008/0168563 A1 * | 7/2008 | Ito et al. | 726/24 |
| 2008/0285560 A1 * | 11/2008 | Curtis et al. | 370/392 |
| 2010/0146063 A1 * | 6/2010 | Lidin et al. | 709/206 |

FOREIGN PATENT DOCUMENTS

| | | |
|---|---|---|
| CN | 1738290 A | 2/2006 |
| CN | 1988543 A | 6/2007 |
| CN | 101184089 A | 5/2008 |
| CN | 101287010 A | 10/2008 |
| CN | 101534248 A | 9/2009 |

OTHER PUBLICATIONS

European Communication pursuant to Rule 62 EPC, the supplemental European search report (Art. 153(7) EPC) and the European search opinion, issued in related Application No. 10835423.4-1244, dated (mailed) Aug. 23, 2012 (11 pgs.).

(Continued)

*Primary Examiner* — Hosain Alam
(74) *Attorney, Agent, or Firm* — Staas & Halsey LLP (57) ABSTRACT

The embodiments of the present invention disclose a method, an apparatus and a system for protocol identification. The implementation of the method includes extracting the identification tuple of a message, wherein the identification tuple at least includes a network address; searching an identification table for the algorithm application list corresponding to the identification tuple; and performing a content identification for the message with an algorithm in the algorithm application list to obtain the protocol type of the message. By using the identification tuple which at least includes IP address and is extracted from the message to search for the corresponding algorithm, and then performing content identification for the message with the searched algorithm, the above implementation can improve the message identification precision and reduce the identification error.

5 Claims, 5 Drawing Sheets

(56) References Cited

OTHER PUBLICATIONS

PCT Written Opinion of the International Searching Authority dated (mailed) Jan. 13, 2011, issued in related Application No. PCT/CN2010/077569 for Huawei Tech Co., Ltd. (4 pgs.).

Kim, Hyunchul, et al.; "Internet Traffic Classification Demystified: Myths, Caveats, and the Best Practices"; (XP-002543268); ACM CoNEXT 2008, Dec. 10-12, Madrid, Spain (12 pgs.).

Li, Zhu, et al.; "Accurate Classification of the Internet Traffic Based on the SVM Method"; IEEE, 2007 (6 pgs.).

Risso, Fulvio, et al.; "Extending the NetPDL Language to Support Traffic Classification"; IEEE 2007 (6 pgs.).

English language International Search Report from the State Intellectual Property Office of P.R. China for International Application No. PCT/CN2010/077569, mailed Jan. 13, 2011.

Chinese Office Action issued Oct. 31, 2012 in corresponding Chinese Patent Application No. 2009102254550.6.

Chinese Office Action mailed Jun. 20, 2013 in corresponding Chinese Application No. 200910225440.6.

\* cited by examiner

METHOD, APPARATUS AND SYSTEM FOR PROTOCOL IDENTIFICATION

CROSS-REFERENCE TO RELATED APPLICATION

This application is a continuation of International Application No. PCT/CN2010/077569, filed on Oct. 5, 2010, which claims priority to Chinese Patent Application No. 200910225440.6, filed with the Chinese Patent on Dec. 10, 2009, both of which are hereby incorporated by reference in their entireties.

FIELD OF THE INVENTION

This invention relates to the field of communication technique, and particularly, to a method, an apparatus and a system for protocol identification.

BACKGROUND OF THE INVENTION

Nowadays, the network bears more and more applications, and the requirement of the bandwidth also becomes increasingly higher. The operator hopes to ensure the operation network to well bear various critical services (e.g., web browsing), while limiting the inordinate occupation of network resources by some non-critical services (e.g., Voice over Internet Protocol (VOIP) and Peer to Peer (P2P)). On this basis, the operator needs to identify the protocol type used in the application layer by the message (or referred to as data stream) born by the network.

The current method for protocol type identification is to identify by polling all possibly matched identification characteristic conditions or algorithms. The manner of polling may be sequentially polling in batches. The specific implementation is generally as follows: protocols of the system are classified into high frequent protocols, ordinary protocols, and infrequent protocols according to the use frequencies of the protocols in the network. When a data stream arrives, the data stream is attempted to be identified with all rules or identification algorithms of the high frequent protocols. In case the identification is failed, all rules or identification algorithms of the ordinary protocols are tried. And if the identification is failed again, all rules or identification algorithms of the infrequent protocols are tried. The current method for protocol type identification may also be pattern matching, and the manner of pattern matching is scanning all the protocols at one time, and searching for a protocol matched with the message. The above two methods both require scanning all the protocols, and thus the efficiency is relatively low.

In order to improve the protocol identification efficiency, a new method for protocol identification is proposed. Internet Protocol (IP) address and port pair of a message are extracted. A preset association table is searched for an entry including the IP address and the port-pair, and the association table stores entries of the correspondence between IP addresses and port-pairs and service types (a service type is corresponding to the used protocol, and once the service type is determined, the protocol used by the message can also be determined). And when the entry including the IP address and port-pair is searched in the preset association table, the service type of the message is that indicated by the entry.

During the process of implementing the present invention, the inventor finds that there are many identification errors when just using the IP address and port-pair to determine the service type of the data stream, because the phenomenon of port multiplexing (i.e., one IP address and port-pair can be used for different types of services) frequently occurs in the current network. Therefore, the method is not suitable to the occasion requiring a high precision of message identification.

SUMMARY OF THE INVENTION

The embodiments of the present invention provide a method, an apparatus and a system for protocol identification to improve the precision of message identification.

In order to solve the above technical problem, the method embodiment for protocol identification provided by the present invention can be implemented by the following technical solutions.

A method for protocol identification includes extracting the identification tuple of a message, the identification tuple at least includes a network address; searching an identification table for the algorithm application list corresponding to the identification tuple; and performing content identification for the message with an algorithm in the algorithm application list to obtain the protocol type of the message.

An apparatus for protocol identification includes an extraction unit configured to extract the identification tuple of a message, the identification tuple at least includes a network address; a storage unit configured to store an identification table; an algorithm search unit configured to search the identification table for the algorithm application list corresponding to the identification tuple; and a protocol identification unit configured to perform content identification for the message with an algorithm in the algorithm application list to obtain the protocol type for the message.

A system for protocol identification includes a message receiving apparatus, and the apparatus for protocol identification provided by the embodiment of the present invention, the apparatus for protocol identification is configured to perform protocol identification for the message received by the message receiving apparatus.

The above technical solutions have the following beneficial effect: by using the identification tuple which at least includes IP address and is extracted from the message to search for the corresponding algorithm and then performing content identification for the message with the searched algorithm, the precision of the message identification can be improved and the identification error can be reduced.

BRIEF DESCRIPTION OF THE DRAWINGS

In order to more clearly describe the technical solutions of the embodiments of the present invention, the drawings to be used in the descriptions of the embodiments will be briefly introduced as follows. Obviously, the following drawings just illustrate some embodiments of the present invention, and a person skilled in the art can obtain other drawings based on these drawings without paying any creative effort.

DETAILED DESCRIPTION OF THE EMBODIMENTS

The technical solutions of the embodiments of the present invention will be clearly and completely described as follows in conjunction with the drawings. Obviously, the described embodiments are just a part of the embodiments of the present invention rather than all the embodiments. Based on the embodiments of the present invention, any other embodiment obtained by a person skilled in the art without paying any creative effort shall fall within the protection scope of the present invention.

Embodiment 1

Figure 1:
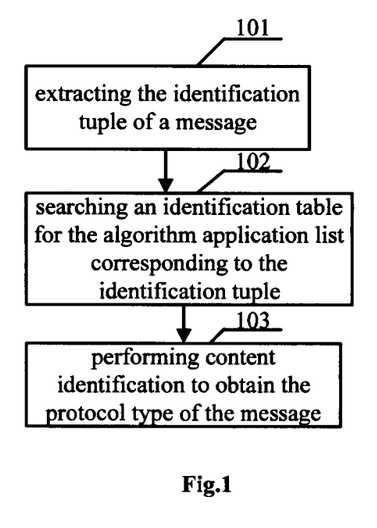
FIG. 1 is a flowchart diagram of a method according to Embodiment 1 of the present invention.

A method for protocol identification is illustrated in the flow chart of FIG. 1.

In step 101, the identification tuple of a message is extracted, and the identification tuple at least includes a network address.

The identification tuple may be N-tuple, for example, may be one-tuple, i.e., network address; two-tuple, i.e., network address and port; or three-tuple, i.e., network address, port and transport layer protocol. Of course, the number of tuples can be concretely set upon the request of protocol identification, and herein is not limited. The IP address may be a source or destination IP address of the message. When the source IP address is used, a source port shall be used, while when the destination IP address is used, a destination port shall be used.

In step 102, the algorithm application list corresponding to the identification tuple is searched for in the identification table.

Specifically, searching the identification table for the algorithm application list corresponding to the identification tuple includes: taking the identification tuple as a key value, and using a hash search method to search the identification table for the algorithm application list corresponding to the identification tuple. As a concrete search manner, the hash search method has an advantage of quick search. It shall be appreciated that the hash search method is not a unique implementation of searching the table for an entry, and thus being taken as an example, the hash search method shall not be construed as a limitation to the embodiment of the present invention. The above search method may search for the algorithm application list corresponding to the identification tuple by matching the identification tuple with the entries in the identification table. In addition, the algorithm may also be construed as a rule of message identification. The identification table may be preset. In addition, a method for dynamically updating the identification table will be introduced in the description of the subsequent embodiment.

In step 103, content identification for the message is performed with an algorithm in the algorithm application list to obtain the protocol type of the message.

Step 102 determines an algorithm preferably used by the message for identification, and then step 103 identifies the message with the algorithm. As can be seen from the above technical solution provided by the embodiment of the present invention, after acquiring the message of the data stream, the embodiment of the present invention firstly selects the algorithm to be preferably used for identification with information of the message such as IP address, port and transport layer protocol. Thus the chances of matching success are high, and it is unnecessary to identify the data stream with all the algorithms by means of polling or pattern matching, thereby achieving high speed protocol identification. In addition, by using the identification tuple which at least includes IP address and is extracted from the message to search for the corresponding algorithm and then performing content identification for the message with the searched algorithm, the precision of the message identification can be improved and the identification error can be reduced.

Figure 2:
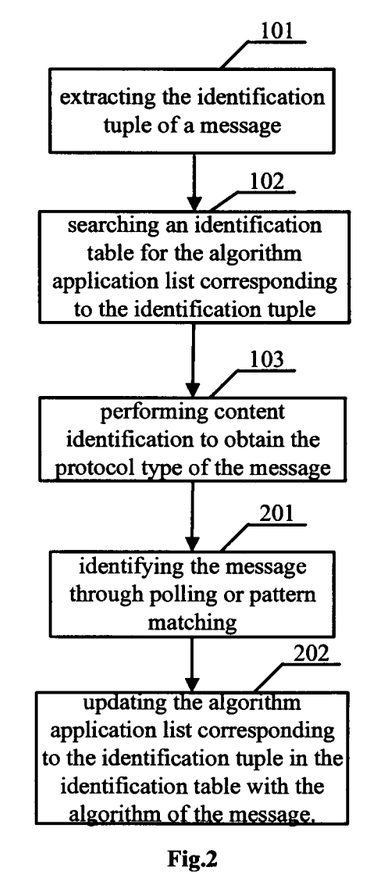
FIG. 2 is a flowchart diagram of a method according to Embodiment 1 of the present invention.

As illustrated in FIG. 2, based on the implementation corresponding to FIG. 1, the method further includes the steps below.

In step 201, if searching the identification table for the algorithm application list corresponding to the identification tuple is failed, or the content identification for the message with the algorithm in the algorithm application list is failed, the message may be identified through polling or pattern matching. Of course, identifying in other manner is not limited in the embodiment of the present invention. The manner of polling may be in batches and fixed sequence, or any manner that attempts to perform pattern matching of all characteristic rules to find out a protocol used by the message, which is not limited in the embodiment of the present invention. The search result of the algorithm application list and whether the content identification for the message is failed can be found in the results of search and identification. Of course, a judging manner is also feasible, which is not limited in the embodiment of the present invention.

Further, the embodiment of the present invention provides a method for dynamically updating the identification table, which may be concretely performed after step 201.

In step 202, the algorithm application list corresponding to the identification tuple in the identification table is updated with the algorithm of the message. As can be appreciated, the identification table may be either updated or not updated when it is preset. And when the identification table is not preset, the algorithm application list corresponding to the identification tuple may be filled into the identification table by performing steps 201 and 202. The update above may be either an addition to the original data, or a creation of new entries to store the identification tuple and the corresponding algorithm application list.

The dynamic addition has the advantage of automatically updating the identification table as the network environment changes, thereby preventing the identification table from being old and not suitable to a new network environment, and avoiding the trouble of manually configuring the identification table.

Embodiment 2

Figure 3:
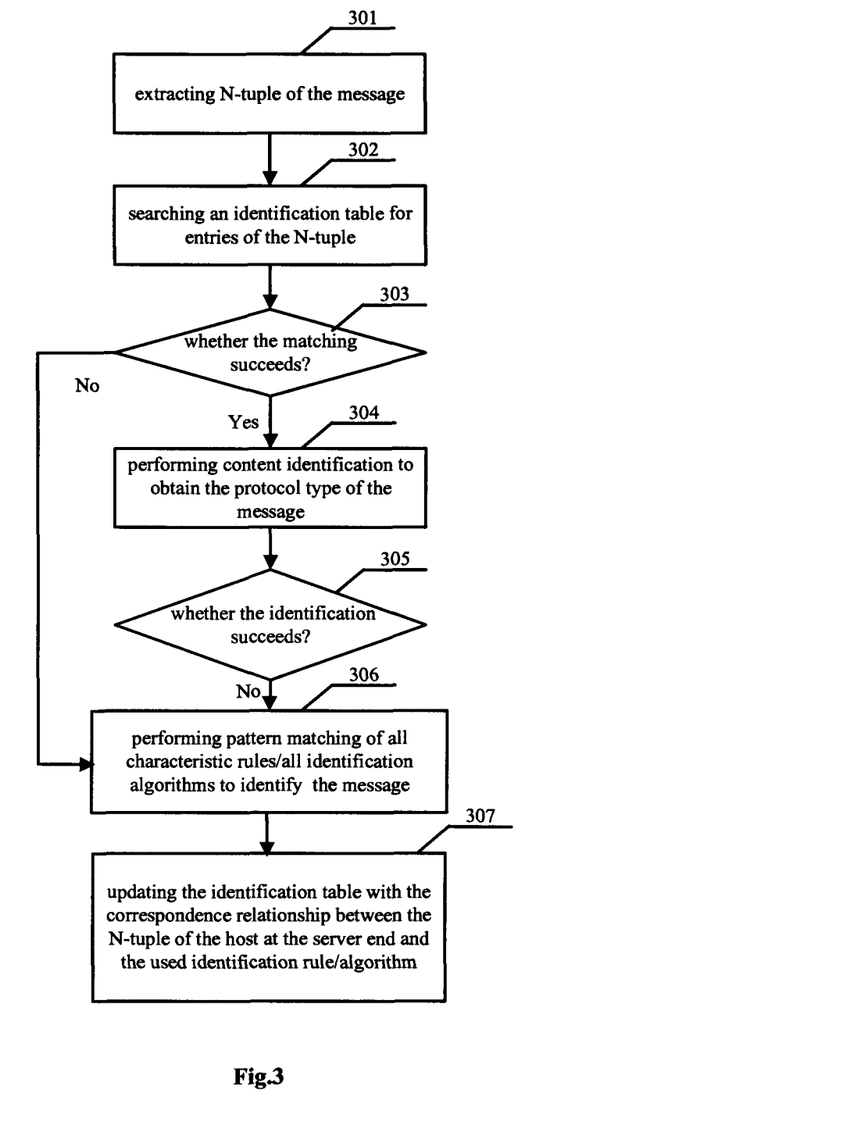
FIG. 3 is a flowchart diagram of a method according to Embodiment 2 of the present invention.

Taking extracting N-tuple information as an example, the identification table is searched through matching, and the method for protocol identification is illustrated through the examples of determining whether or not the search and the identification succeed in the manner of judging, as illustrated in FIG. 3. In step 301, N-tuple of the message is extracted. The N-tuple includes network address, port and transmission layer protocol of the message, etc.

The N-tuple may be one-tuple (only including the network address), two-tuple (including the network address and port) or three-tuple (including the network address, port and transmission layer protocol such as Transmission Control Protocol (TCP)/User Datagram Protocol (UDP)/Stream Control Transmission Protocol (SCTP)).

In the current network, many data streams are client/server type of applications. Wherein a host serving as a server usually only provides a few protocol types of services, and the server host provides a fixed service at a fixed port, i.e., usually just one protocol type of service is provided at one port within a certain period. In consideration of the port multiplexing, the same port of the host may provide other protocol types of service, and it cannot be determined whether the same port of the same host is changed to provide additional other protocol types of service. Therefore, after having identified that a certain protocol type of service is provided at a specific port of a certain host, the N-tuple information (a combination of the network address, port and transmission layer protocol) of the host is recorded, and a rule/algorithm for identifying the protocol type is corresponded to the N-tuple. When a subsequent stream arrives, if its N-tuple is the same as that previously stored, the rule/algorithm for protocol identification corresponding to the previously stored N-tuple will be firstly used for identification. In most circumstances, the type of protocol used by the stream can be identified with corresponding rule/algorithm, and it is unnecessary to attempt other rules/algorithms. So the identification performance of a same stream can be improved by several times through such identification, and no identification error will be caused. The N-tuple information in the embodiment of the present invention may be composed of source or destination information of a stream. Since the message includes two IPs and two ports (i.e., source and destination IPs and source and destination ports), respectively, the source information includes source IP and source port of the message, while the destination information includes destination IP and destination port of the message. The source or destination information is needed to construct the N-tuple, and the transmission layer protocol is also required to construct the three-tuple.

In step 302, entries of the N-tuple is searched for in the identification table by using the N-tuple described above through matching, and the identification table stores entries of correspondence between the N-tuple and the application list.

The entries in the identification table may be obtained as follows: according to the result of protocol identification, determining and storing N-tuple information of the host that provides the service; since the port may be multiplexed, and it cannot be determined when the type of the service provided by the port will be changed, the N-tuple information is kept to be corresponding to the application list such as the used rule/algorithm for identification. During the usage, extracting the N-tuple information of the message to be identified, and matching in the identification table. The matching with entries in the identification table is successful once the N-tuple information composed of one of source and destination information of the message to be matched is matched. It is suggested to adopt hash search and take the N-tuple as a key value to search the identification table.

In step 303, it is determined whether the matching succeeds. The flow may proceed to step 304 in case of success, and otherwise proceed to step 306.

In step 304, content identification is performed with an algorithm/rule application list of the searched entry to obtain the protocol type of the message.

Since the N-tuple in the identification table has corresponding identification rule/algorithm application list, when the N-tuple of the message to be identified is matched in the identification table, the corresponding identification rule/algorithm application list can be used to perform a content identification for the message to obtain the protocol type of the message.

In step 305, it is determined whether the content identification succeeds. The flow ends in case of success, and otherwise proceeds to step 306.

In step 306, the message is identified by performing pattern matching of all characteristic rules/by performing all identification algorithms.

Step 306 may use any current method to perform the identification or matching, e.g., attempting polling or pattern matching of all identification algorithms to perform content identification for the message to be identified. The concrete manner is not limited in the embodiment of the present invention.

In step 307, after the identification succeeds, if it is determined the protocol used by the message is client/server type protocol, identification table is updated with the correspondence between the N-tuple of the host at the server end and the used identification rule/algorithm. Specifically, the implementation of updating step may be: determining and extracting information (e.g., network address, port, transmission layer protocol) of the host serving as the server in the message according to the identification rule/algorithm to construct the N-tuple, and next searching a quick association table for corresponding N-tuple, and when corresponding N-tuple is found, replacing the application of identification rule/algorithm corresponding to that N-tuple with the application of currently used new rule/algorithm, or adding the new rule/algorithm into the existed application list. In case the identification tuple uses one-tuple only including the network address, the update processing may be performed in the manner of addition. In case the two-tuple or three-tuple is used, the update processing may be performed in the manner of replacement.

In the actual network, data streams using the client/server type protocols (mainly P2P, Hypertext Transfer Protocol (HTTP), other WEB protocols, etc.) occupy most of the network traffic. The solution implemented by the present invention may use such a protocol that is based on the successful identification of data stream and improves the identification performances of subsequent streams, thereby improving the performance of the whole identification apparatus. Tests show that by such processing, identification performances of subsequent streams are greatly improved as compared with the first stream with respect to the identification of client/server type protocols, and performance of the whole apparatus for protocol identification is improved by more than 50%.

Embodiment 3

Figure 4:
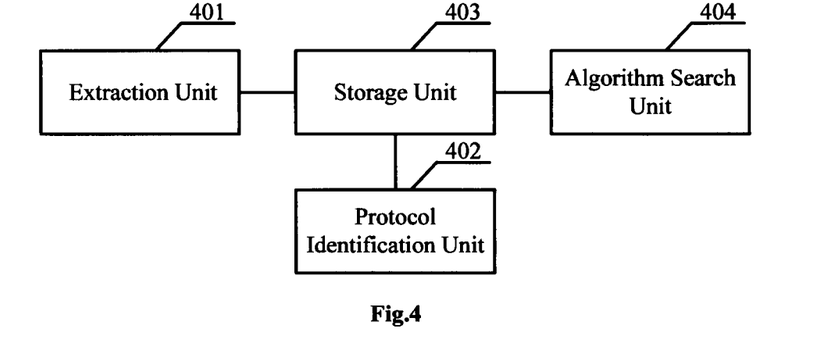
FIG. 4 is a structure diagram of an apparatus according to Embodiment 3 of the present invention.

As shown in FIG. 4, the embodiment of the present invention further provides an apparatus for protocol identification, which includes an extraction unit 401, a storage unit 402, an algorithm search unit 403 and a protocol identification unit 404. The extraction unit 401 is configured to extract identification tuple of a message, and the identification tuple at least includes a network address. The storage unit 402 is configured to store an identification table. The algorithm search unit 403 is configured to search the identification table for an algorithm application list corresponding to the identification tuple. The protocol identification unit 404 is configured to perform a content identification for the message with the algorithm in the algorithm application list to obtain the protocol type of the message.

Specifically, the extraction unit 401 is configured to extract the network address of the message, or the network address and port, or the network address, port and transmission layer protocol.

Figure 5:
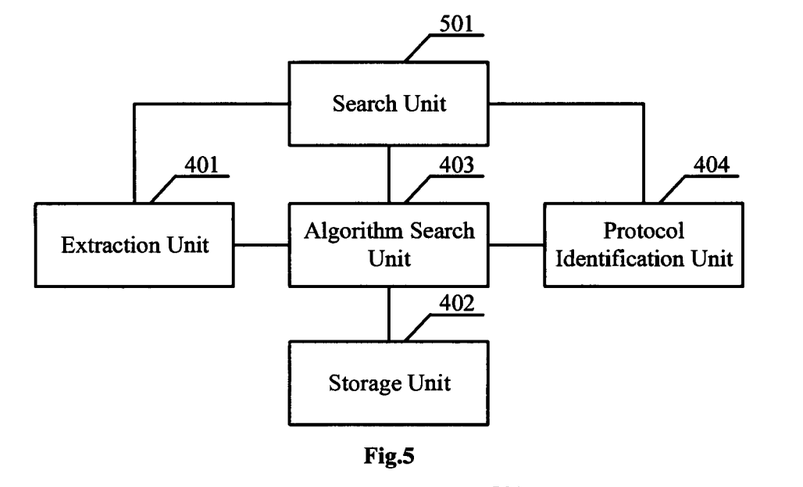
FIG. 5 is a structure diagram of an apparatus according to Embodiment 3 of the present invention.

As illustrated in FIG. 5, the apparatus further includes a search unit 501. The search unit 501 is configured to identify the message through polling or pattern matching when searching the identification table for an algorithm application list corresponding to the identification tuple is failed, or the content identification for the message with the algorithm in the algorithm application list is failed.

Figure 6:
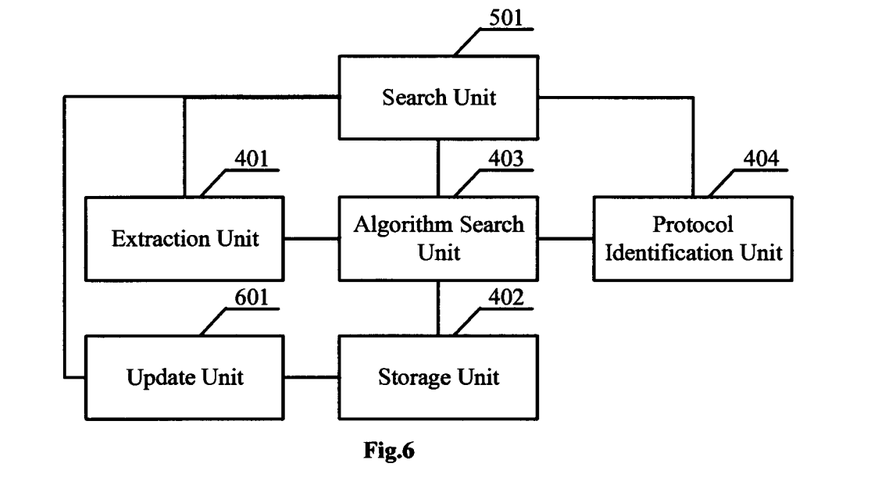
FIG. 6 is a structure diagram of an apparatus according to Embodiment 3 of the present invention.

As illustrated in FIG. 6, the apparatus further includes an update unit 601. The update unit 601 is configured to update the algorithm application list corresponding to the identification tuple in the identification table with the algorithm of the message, after the message is identified through polling or pattern matching.

Specifically, the algorithm search unit 403 is configured to search the identification table for the algorithm application list corresponding to the identification tuple by using the hash search method and taking the identification tuple as a key value.

As can be seen from the technical solution provided by the embodiment of the present invention, after acquiring the message of the data stream, the embodiment of the present invention firstly selects the algorithm to be preferably used for identification with information of the message such as IP address, port and transport layer protocol. Thus the chances of matching success are high, and it is unnecessary to identify the data stream with all the algorithms by means of polling or pattern matching, thereby achieving high speed protocol identification. In addition, corresponding algorithm is searched for with the identification tuple which at least includes IP address and is extracted from the message, and then a content identification for the message is performed with the searched algorithm. The content identification can improve the message identification precision and reduce the identification error.

The implementation using dynamic addition has the advantage of automatically updating the identification table as the network environment changes, thereby preventing the identification table from being old and not suitable to a new network environment, and avoiding the trouble of manually configuring the identification table.

Figure 7:
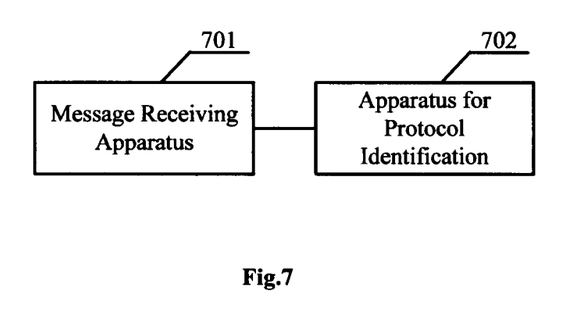
FIG. 7 is a structure diagram of a system according to Embodiment 4 of the present invention.

As illustrated in FIG. 7, the embodiment of the present invention further provides a system for protocol identification, which includes a message receiving apparatus 701, and any apparatus 702 for protocol identification provided by the embodiment of the present invention. The apparatus 702 for protocol identification is configured to perform a protocol identification for the message received by the message receiving apparatus 701. The implementation of the protocol identification for the message may refer to the method embodiment or the embodiment of the apparatus for protocol identification.

As can be seen from the technical solutions provided by the embodiment of the present invention, after acquiring the message of the data stream, the embodiment of the present invention firstly selects the algorithm to be preferably used for identification with information of the message such as IP address, port and transport layer protocol. Thus the chances of matching success are high, and it is unnecessary to identify the data stream with all the algorithms by means of polling or pattern matching, thereby achieving high speed protocol identification. In addition, corresponding algorithm is searched for with the identification tuple which at least includes IP address and is extracted from the message, and then a content identification for the message is performed with the searched algorithm. The content identification can improve the message identification precision and reduce the identification error.

A person skilled in the art can appreciate that all or a part of steps in the methods according to the above embodiments are implemented by instructing relevant hardware through a program that may be stored in a computer readable storage medium (e.g., ROM, magnetic disk, optical disk, etc.).

The method, apparatus and system for protocol identification provided by the embodiments of the present invention are described in detail as above, and specific examples are used to illustrate the principle and embodiments of the present invention. The above embodiments are only described to help understanding the methods and core concept of the present invention. Meanwhile, a person skilled in the art may change the embodiments and application range according to the concept of the present invention. Therefore, the Specification shall not be construed as a limitation to the present invention.

What is claimed is:

1. A method of protocol identification, comprising:
   extracting identification tuple of a message, the identification tuple at least comprises a network address;
   searching an identification table for an algorithm application list corresponding to the identification tuple, wherein the identification table stores a correspondence between the identification tuple and the algorithm application list, and the algorithm application list includes one of protocol identification rules and algorithms to be used; and
   performing content identification for the message with an algorithm in the algorithm application list to obtain a protocol type of the message, and
   wherein when searching the identification table for the algorithm application list corresponding to the identification tuple is failed, or the content identification for the message with the algorithm in the algorithm application list is failed, the message is identified through polling or pattern matching, and
   wherein after identifying the message through polling or pattern matching, the method further comprises:
   updating the algorithm application list corresponding to the identification tuple in the identification table with the algorithm of the message, and
   wherein searching the identification table for the algorithm application list corresponding to the identification tuple comprises taking the identification tuple as a key value, and using a hash search method to search the identification table for the algorithm application list corresponding to the identification tuple.

2. The method according to claim 1, wherein the identification tuple comprises a network address, or a network address and a port, or a network address, a port and a transmission layer protocol.

3. A non-transitory computer-readable medium comprising instructions, which, when executed by a computer, cause the computer to perform a method for protocol identification, the method comprising:
   extracting identification tuple of a message, the identification tuple at least includes a network address;
   storing an identification table;
   searching the identification table for an algorithm application list corresponding to the identification tuple, wherein the identification table stores a correspondence between the identification tuple and the algorithm application list, and the algorithm application list includes one of protocol identification rules and algorithms to be used;
   performing content identification for the message with an algorithm in the algorithm application list to obtain a protocol type of the message,
   identifying the message in the manner of polling or pattern matching when searching the identification table for the algorithm application list corresponding to the identification tuple is failed, or the content identification for the message with the algorithm in the algorithm application list is failed; and updating the algorithm application list corresponding to the identification tuple in the identification table with the algorithm of the message, after the message is identified in the manner of polling or pattern matching, and wherein the searching of the identification table for the algorithm application list corresponding to the identification tuple includes taking the identification tuple as a key value and using a hash search method to search the identification table for the algorithm application list corresponding to the identification tuple.

4. The non-transitory computer-readable medium according to claim 3, wherein extracting the identification tuple comprises extracting a network address, or a network address and a port, or a network address, a port and a transmission layer protocol of the message.

5. The non-transitory computer-readable medium according to claim 3, wherein non-transitory computer-readable medium further comprise instructions which when executed by a computer, cause the computer to perform protocol identification for the message received by the message receiving apparatus.

* * * * *